United States Patent [19]

Matherne

[11] 4,049,555
[45] Sept. 20, 1977

[54] REUSABLE FILTER APPARATUS

[75] Inventor: Charley F. Matherne, Harvey, La.

[73] Assignee: Lawrence Peska Associates, Inc., New York, N.Y.

[21] Appl. No.: 680,177

[22] Filed: Apr. 26, 1976

[51] Int. Cl.² ............... B01D 35/00; B01D 46/04
[52] U.S. Cl. ........................... 210/409; 55/243; 134/93
[58] Field of Search ............ 55/242, 243; 134/93, 134/138, 130, 166 R, 169 A; 210/409

[56] References Cited
U.S. PATENT DOCUMENTS

| | | |
|---|---|---|
| 3,075,534 | 1/1963 | Habostad .................. 134/138 |
| 3,255,810 | 6/1966 | Rowbottam ................ 160/354 |
| 3,586,012 | 6/1971 | Paule ........................ 134/93 |
| 3,820,552 | 6/1974 | Lang et al. ................ 134/169 A |

Primary Examiner—Frank A. Spear, Jr.
Assistant Examiner—Richard W. Burks

[57] ABSTRACT

Apparatus is disclosed comprising a reusable filter insertable in an enclosure having openings therein for the passage of a cleaning fluid through the filter and out of the enclosure. The enclosure may comprise a cylinder into which the filter is inserted.

The filter element in one embodiment comprises a resilient filter windable on itself for insertion in the enclosure which may comprise a cylindrical enclosure.

2 Claims, 5 Drawing Figures

REUSABLE FILTER APPARATUS

SUMMARY OF THE INVENTION

The present invention relates to apparatus comprising a reusable filter, the filter being insertable in an enclosure having a fluid influent and a fluid effluent therein for passing a cleaning fluid through the enclosure and for cleaning the filter when the filter is placed in the enclosure. A removable cap is provided on the enclosure for inserting and removing the filter from the enclosure and for sealing the enclosure after the filter is inserted therein. The enclosure may also have a chamber for holding a cleaning composition so that the passage of a fluid into the enclosure when the filter is positioned therein will disperse the cleaning composition in the chamber throughout the enclosure and the filter to assist in the cleaning of the filter. The chamber is preferably positioned adjacent or next adjacent the influent of the enclosure.

In one embodiment the enclosure comprises a cylinder, the influent comprising an opening in the top of the cylinder and the effluent comprising an opening in the bottom of the cylinder. The filter element for insertion into the cylinder comprises a planar filter resiliently windable on itself for insertion in the enclosure. The cap for the enclosure is a removable closure fitting over one end of the cylinder.

In another embodiment the invention relates to a planar reusable filter comprising a flexible filter element the periphery of the filter element being secured to a resilient frame whereby the filter can be rolled and inserted in a tubular container or cylindrical container having influent and effluent ports to pass a cleaning fluid through the filter and to clean the filter after which the filter may be removed and reused. The filter element may comprise a screen such as a metallic screen or a screen made of fiberglass or plastic materials or natural fibers well known in the art. The filter may also be made of a foamed material such as an open celled flexible polyurethane foam or other flexible foams which are the art known equivalents there. The resilient frame may be made of any flexible or resilient material such as rubber, resilient and flexible plastic materials and resilient and flexible metals such as a pre-stressed spring steel. The filter element may be removably securable to the resilient frame and the resilient frame may be removably secured to a rigid frame.

The filter may be used to filter air passed through an air-conditioning unit or a hot air furnace.

DETAILED DESCRIPTION

Figure 1:
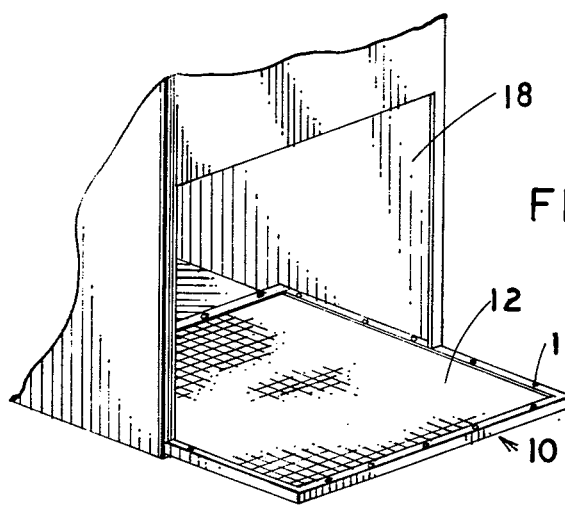
FIG. 1 is a perspective view illustrating a reusable filter being inserted in an air conditioning unit according to one embodiment of the present invention.
Figure 3:
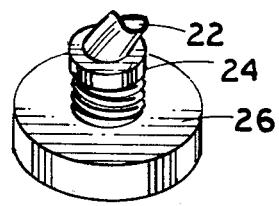
FIG. 3 is an plan view of a reusable filter according to another embodiment of the present invention.
Figure 2:
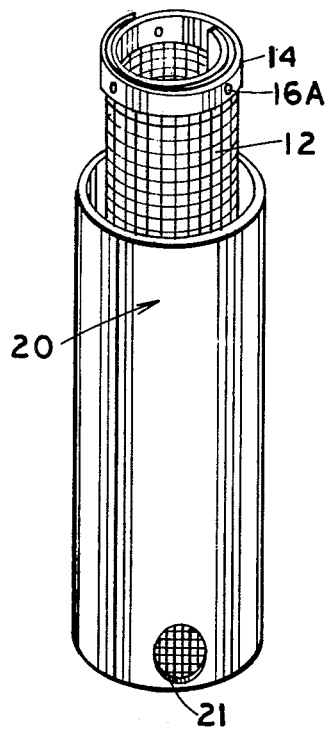
FIG. 2 is an exploded perspective view illustrating a reusable filter insertable in a washing and storage compartment according to another embodiment of the present invention.
Figure 4:
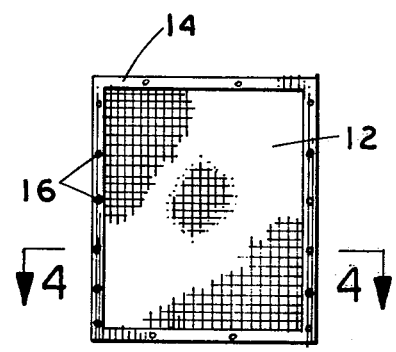
FIG. 4 is a side elevation in section taken along the line 4—4 of FIG. 3.
Figure 4:
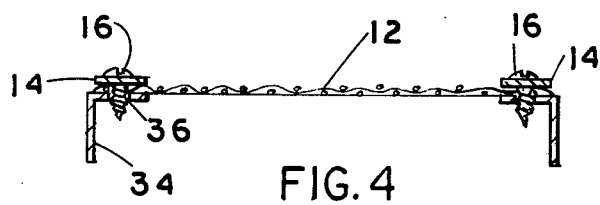
Figure 5:
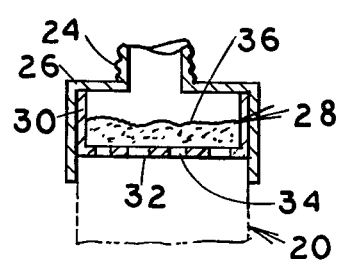
FIG. 5 is a side elevation in section of a cap having a cleaning composition chamber therein for holding a cleaning composition, the cap being fitted over an enclosure for holding a reusable filter element according to another embodiment of the present invention.

Filtering screens are known and disclosed in the prior art U.S. Pat. No. 3,755,995 Stickel; U.S. Pat. No. 3,447,691 Andrews et al.; U.S. Pat. No. 3,255,810 Rowottam; U.S. Pat. No. 3,127,259 Boylan; U.S. Pat. No. 3,107,991 Taussig; U.S. Pat. No. 2,869,694 Breckheimer; U.S. Pat. No. 2,783,834 Brame; U.S. Pat. No. 2,421,743 Cartter et al. and U.S. Pat. No. 1,850,101 Greene.

In cleaning a reusable filter, with a fluid such as water, a great deal of fluid has to be used when directed over the surface of the filter area such as by spraying or the like. The immersion cleaning of a filter in a fluid is not always satisfactory since in some instances the size of the filter is such that it is difficult to provide a receptacle large enough in which the filter can be inserted for subsequent cleansing.

One of the other difficulties encountered in cleaning reusable filters is the cleaning compound sometimes required has to be used in large quantities when the cleaning fluid is sprayed over the filter or when the filter is cleaned in a large bath.

It is therefore an object of the present invention to overcome these and other difficulties encountered in the prior art.

It is a further object of the present invention to provide a reusable filter which may be readily cleaned.

It is also an object of the present invention to provide a reusable filter that is readily inserted into a relatively small container for either cleaning or storage purposes.

It is a further object of the present invention to provide a relatively small container for holding a reusable filter, the container having a chamber therein for a cleaning composition to minimize the amount of cleaning composition required in cleaning a filter for reuse.

It is another object of the present invention to provide a reusable filter which may be compacted to insert in a relatively small enclosure for cleaning and/or storage of the filter.

These and other objects have been achieved according to the present invention and will become apparent from the disclosure and claims that follow as well as the appended drawing.

Referring to the drawing and FIGS. 1–5, a filter 10 is illustrated having a filter element comprising a screen 12, said screen being made of either stainless steel wire, aluminum wire or other metallic wires as well as non-metallic wires or filaments such as polymeric fibers including nylon, Dacron (trademark) and equivalent polyester fibers, acrylic fibers, glass fibers, carbon fibers and other inorganic fibers and the art known equivalents thereof. Screen 12 is supported on a flexible frame 14, frame 14 being made of a pre-stressed spring steel or other resilient material such as rubber or flexible plastic materials known in the art. Screen 12 is removably secured to frame 14 by means of screw fasteners 16 passing through openings 16A in frame 14, the flexible assembly of screen 12 and frame 14 being securable to a rigid frame 34 having openings 36 therein for securing frame 14 and screen 12 thereto by means of screws 16.

When the filter element 12 is removed from frame 34 it may be wound on itself by virtue of its resiliently windable construction and inserted in an enclosure such as a cylinder or tube 20 having an opening 21 in the bottom thereof and a hose inlet 22 secured to the cap 26 thereof by means of hose fitting 24. Cap 26 comprises a removable cap which fits over the opening of enclosure 20 and is used for inserting and removing the filter comprising screen 12 and frame 14 from enclosure 20 and for sealing the end of enclosure 20 after the filter element is inserted therein. A chamber 28 comprising a circular side wall 30 and a bottom wall 32 having perforations 34 therein is placed adjacent or next adjacent the influent 22, chamber 28 holding a cleaning composition such as a soap or detergent or the art known equivalents thereof.

In use, a filter comprising screen 12 and frame 14 optionally connected to frame 34 through fasteners 16 is inserted in an air conditioning unit such as air conditioner 18 as illustrated in FIG. 1 and used until the pores of the screen become clogged. Upon becoming plugged up or clogged, the filter is wound about a vertical axis and inserted into container 20. A cleaning composition such as a detergent is placed in the chamber 28 and the chamber 28 in the cap 26 after which cap 26 is secured to the top of enclosure 20. Hose fitting 24 is connected to a hose 22 and water forced through the cleaning composition 36 in chamber 28 until the chamber 28 is emptied, this mixture of water and cleaning composition being effective to clean the filter so that it may be removed from the enclosure 20, resured to the frame 34 and reinserted in the air conditioner.

Although the invention has been described by reference to some embodiments, it is not intended that the novel apparatus be limited thereby, but that modifications thereof are intended to be included as falling within the broad scope and spirit of the foregoing disclosure, the following claims and the appended drawing.

What is claimed is:

1. Apparatus comprising a reusable flexible screen filter element and its cleaning means, the periphery of said filter element being secured to resilient frame means, said filter being resiliently windable on itself for insertion into said cleaning means, the cleaning means comprising a cylindrical container having an inlet port and an outlet port to pass a cleaning fluid through said filter and to clean said filter after which said filter may be removed and reused, removable cap means on said container for inserting and removing said filter from said container and for sealing said container after said filter is inserted therein, said inlet port comprising an opening in the top of said container, said outlet port comprising an opening in the bottom of said container, said cap comprising a removable closure fitting over said inlet port, chamber means in said closure for holding a cleaning composition, said chamber means comprising a cylindrical side wall extending into a bottom wall having perforations therein, said chamber being placed proximate said inlet port and adapted to hold a cleaning composition for application to said screen filter element when a fluid is passed into said inlet port, through said container and out of said outlet port.

2. The apparatus of claim 1 where said screen filter element is removably secured to said resilient frame.

* * * * *